US008509775B2

(12) United States Patent
Yokota (10) Patent No.: US 8,509,775 B2
(45) Date of Patent: Aug. 13, 2013

(54) COMMUNICATION CONTROL APPARATUS DETERMINING TERMINAL CONNECTION (75) Inventor: Tomoyoshi Yokota, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 45 days.

(21) Appl. No.: 10/928,842

(22) Filed: Aug. 27, 2004

(65) Prior Publication Data

US 2005/0096057 A1 May 5, 2005

(30) Foreign Application Priority Data

Aug. 28, 2003 (JP) ............................... P.2003-305529

(51) Int. Cl.
*H04B 1/16* (2006.01)
*H04B 7/15* (2006.01)
*H04B 3/36* (2006.01)
*H04W 36/00* (2009.01)
*H04W 72/00* (2009.01)

(52) U.S. Cl.
USPC .......... 455/436; 455/444; 455/11.1; 455/450; 455/13.1; 455/7; 370/351

(58) Field of Classification Search
USPC .................. 455/436–444, 11.1, 450, 13.1, 7; 370/351
See application file for complete search history.

(56) References Cited

U.S. PATENT DOCUMENTS

| 5,541,979 | A | * | 7/1996 | Leslie et al. | 455/436 |
|---|---|---|---|---|---|
| 5,867,785 | A | * | 2/1999 | Averbuch et al. | 455/436 |
| 6,132,306 | A | * | 10/2000 | Trompower | 455/11.1 |
| 6,243,575 | B1 | * | 6/2001 | Ohyama et al. | 455/456.4 |
| 6,304,556 | B1 | * | 10/2001 | Haas | 370/254 |
| 6,389,265 | B1 | * | 5/2002 | Jeschke et al. | 455/69 |
| 6,459,881 | B1 | * | 10/2002 | Hoder et al. | 455/11.1 |
| 6,768,718 | B1 | * | 7/2004 | Beshai et al. | 370/237 |
| 6,957,071 | B1 | * | 10/2005 | Holur et al. | 455/452.2 |
| 2001/0004599 | A1 | * | 6/2001 | Dokko | 455/452 |
| 2002/0137517 | A1 | * | 9/2002 | Williams et al. | 455/444 |
| 2003/0078048 | A1 | * | 4/2003 | Henriksson | 455/446 |
| 2004/0005878 | A1 | | 1/2004 | Olin et al. | |
| 2004/0223470 | A1 | * | 11/2004 | Smith | 370/332 |

FOREIGN PATENT DOCUMENTS

| JP | 2000069050 A | 3/2000 |
|---|---|---|
| JP | 2000078147 A | 3/2000 |
| JP | 2000232677 A | 8/2000 |
| JP | 2001244964 A | 9/2001 |

(Continued)

OTHER PUBLICATIONS

Japanese language office action and its English language translation for corresponding Japanese application 2003305529 lists the references above.

(Continued)

*Primary Examiner* — Ariel Balaoing
(74) *Attorney, Agent, or Firm* — DLA Piper LLP (US)

(57) ABSTRACT

An EV-DO terminal module is made up of hardware and software for implementing the function as an EV-DO terminal. A W-LAN terminal module is made up of hardware and software for implementing the function as an AP of W-LAN. An information exchange terminal module has a function equal to that of the W-LAN terminal module. A control module has a dialup function and a function based on PPP protocol and is a hardware and software module for controlling the EV-DO terminal module, the information exchange terminal module, and the W-LAN terminal module.

17 Claims, 9 Drawing Sheets

(56) References Cited

FOREIGN PATENT DOCUMENTS

| | | |
|---|---|---|
| JP | 2001245355 A | 9/2001 |
| JP | 2002010315 A | 1/2002 |
| JP | 2002111722 A | 4/2002 |
| JP | 2002-300644 | 10/2002 |
| JP | 2002305540 A | 10/2002 |
| JP | 2002305541 A | 10/2002 |
| JP | 2002369245 A | 12/2002 |
| JP | 2004523143 A | 7/2004 |
| JP | 2005510956 T | 4/2005 |
| WO | 03047175 A1 | 6/2003 |

OTHER PUBLICATIONS

Japanese language office action dated May 8, 2012 and its English language translation issued in corresponding Japanese application 2009119941 cites the foreign patent documents above.

* cited by examiner

| COMMUNI-CATION APPARATUS ID | EV-DO DOWNLINK AVERAGE THROUGH-PUT (bps) | THE NUMBER OF EV-DO USE TERMINALS | EV-DO THROUGH-PUT PER TERMINAL (bps) | W-LAN AVERAGE TRAFFIC (bps) | THE NUMBER OF TERMINALS | W-LAN TERMINAL INFORMATION | | |
|---|---|---|---|---|---|---|---|---|
| | | | | | | TERMINAL ID | RELAY DESTINATION ID | TRAFFIC (bps) | USE OF EV-DO |
| 1 | $X_1$ | $T_1$ | $X_1/T_1$ | $Y_1$ | $Z_1$ | 1 .... i .... M | N-1 .... 0 .... 0 | A .... B .... C | YES .... YES .... NO |
| 2 | $X_2$ | $T_2$ | $X_2/T_2$ | $Y_2$ | $Z_2$ | 1 .... i .... M | 0 .... 0 .... 0 | D .... E .... F | NO .... YES .... NO |
| i | $X_i$ | $T_i$ | $X_i/T_i$ | $Y_i$ | $Z_i$ | 1 .... i .... M | 0 .... 0 .... 0 | G .... H .... I | YES .... NO .... YES |
| N | $X_N$ | $T_N$ | $X_N/T_N$ | $Y_N$ | $Z_N$ | 1 .... i .... M | M .... 0 .... 0 | P .... Q .... R | YES .... NO .... NO |

FIG. 5

| EV-DO THROUGHPUT RANGE (bps) | UPPER LIMIT TRESHOLD VALUE OF THE NUMBER OF SERVER ACCESS TERMINALS | UPPER LIMIT TRESHOLD VALUE OF THE NUMBER OF EV-DO ACCESS TERMINALS |
|---|---|---|
| $0 - Th_1$ | M | $S_1$ |
| ⋮ | ⋮ | ⋮ |
| $Th_i - Th_{i+1}$ | M | $S_{i+1}$ |
| ⋮ | ⋮ | ⋮ |
| $Th_{N-1} - Th_N$ | M | $S_N$ |

| TYPE NO. | CONTENTS |
| --- | --- |
| 1 | TRAFFIC INFORMATION COLLECTION |
| 2 | RELAY COMMAND (EXTERNAL) |
| 3 | RELAY COMMAND (NEW) |
| 4 | TRAFFIC INFORMATION |
| 5 | UPLINK RELAY DATA (EXTERNAL) |
| 6 | DOWNLINK RELAY DATA (EXTERNAL) |
| 7 | UPLINK RELAY DATA (NEW) |
| 8 | DOWNLINK RELAY DATA (NEW) |

FIG. 8

COMMUNICATION CONTROL APPARATUS DETERMINING TERMINAL CONNECTION

BACKGROUND OF THE INVENTION

1. Field of the Invention

The invention relates to a communication control apparatus that determines a base station to communicate with, and a communication apparatus and a communication system using the communication control apparatus.

2. Description of the Related Art

In recent years, cdma2000 1×-EV DO (hereafter referred to as "EV-DO") has been developed as a next-generation high-speed radio communication system. The EV-DO is a system of specializing cdma2000 1× provided by expanding cdma2000 to the third-generation system for data communications and increasing the transmission rate. Here, "EV" means Evolution and "DO" means Data Only.

In the EV-DO, the configuration of a radio interface of an uplink from a radio communication terminal to a base station is almost similar to that in the cdma2000 1×. The radio interface configuration of a downlink from a base station to a radio communication terminal is the same as that in the cdma2000 1× in the band width stipulated to 1.23 MHz. On the other hand, it differs largely from that in the cdma2000 1× in the modulation system, multiplexing method, etc. The modulation system used in the cdma2000 1× is QPSK, HPSK; in the EV-DO, the modulation system is switched to QPSK, 8-PSK, or 16 QAM in response to the reception state of the downlink in a radio communication terminal. Consequently, if the reception state is good, a high transmission rate with low error tolerance is used and if the reception state is bad, a low transmission rate with high error tolerance is used.

TDMA (Time Division Multiple Access) rather than CDMA (Code Division Multiple Access) used in cdmaOne and cdma2000 1× is used as the multiplexing method for simultaneously conducting communications from one base station to a plurality of radio communication terminals. In the TDMA, the time is divided in 1/600 second units and communications are conducted only with one radio communication terminal in one time unit and further the radio communication terminal is switched every unit time for conducting communications with a plurality of radio communication terminals, The radio communication terminal measures the Carrier to Interference power Ratio (CIR) of a pilot signal as the reception state of the downlink from the base station. The radio communication terminal also predicts the reception state at the next reception timing from the fluctuation in the CIR and sends the "receivable maximum transmission rate at a predetermined error rate or less" expected based on the prediction result to the base station as a Data Rate Control bit (DRC). Here, the predetermined error rate depends on the system design and usually is about 1%. The base station receives the DRC from a plurality of radio communication terminals and determines which radio communication terminal the base station is to communicate with in each time unit. To communicate with each radio communication terminal, basically the base station uses the high transmission rate as much as possible based on the DRC from the radio communication terminal.

In the EV-DO, the transmission rate of a maximum of 2.4 Mbps per sector is possible on the downlink. However, the transmission rate is the total of the data communication amounts with a plurality of radio communication terminals to which one base station is connected in one frequency band in one of sectors usually provided; if a plurality of frequency bands are used, the transmission rate is also increased.

JP-A-2002-300644 is known as a related art.

When the user conducts communications in the EV-DO in a building or a railroad vehicle, the strength of the radio signal received by the radio communication terminal may be insufficient or distortion of the radio signal may grow. In this case, generally the EV-DO transmission rate becomes low. Under such circumstances, an example of a method for improving the EV-DO transmission rate is to install a communication apparatus compatible with the EV-DO in a vehicle. The communication apparatus can communicate with an EV-DO base station installed outside the vehicle. Further, the communication apparatus includes a function as a base station in a wireless LAN system (hereafter referred to as "W-LAN"). The communication apparatus including the function can communicate with a W-LAN terminal used by the user in a vehicle. That is, the user can use a W-LAN terminal in a vehicle for connecting to the communication apparatus. The communication apparatus connected with the W-LAN terminal transmits and receives data between an EV-DO base station and the W-LAN terminal. If an antenna of such a communication apparatus is installed in a place of the vehicle where a good propagation environment is provided, the EV-DO transmission rate is improved.

If the communication apparatus is installed in each of the vehicles, the terminal used by the user usually communicates with the base station through the communication apparatus installed in the vehicle in which the user rides. However, if the number of terminals in the vehicle increases and connection from the communication apparatus to the base station concentrates, the terminals connected to the communication apparatus share the transmission band used by the base station. Generally, the EV-DO transmission rate is lower than the W-LAN transmission rate and thus the transmission rate per terminal is decreased as the transmission band is shared.

Further, when an information distribution server is installed in a vehicle for distributing information to terminals through the communication apparatus, if the number of terminals in the vehicle increases and connection to the information distribution server concentrates, the processing amount of the information distribution server increases. Also in this case, the transmission rate per terminal is decreased.

SUMMARY OF THE INVENTION

The object of the invention is to provide a communication control apparatus capable of improving the transmission rate, and a communication apparatus and a communication system using the communication control apparatus.

The invention provides a communication control apparatus for controlling a communication apparatus to which at least one terminal can connect by radio and that can radio-communicate with a base station, the communication control apparatus having: a communication section that communicates with a plurality of communication apparatuses; an information acquisition section that acquires traffic information of the plurality of communication apparatuses through the communication section; a monitor section that monitors traffic of each communication apparatus based on the traffic information acquired by the information acquisition section; and a control section that controls a communication apparatus to which the terminal connects based on the traffic of each communication apparatus.

Thus, since the communication apparatus to which the terminal connects is determined based on the traffic of each communication apparatus, the transmission rate can be improved.

The traffic of each communication apparatus may be a transmission rate of radio communications between the communication apparatus and the base station. The traffic of each communication apparatus may be the amount of utilization of a line between the communication apparatus and the terminal, or the number of terminals connected to the communication apparatus.

The invention also provides a communication apparatus to which at least one terminal can connect by radio and that can radio-communicate with a base station, the communication apparatus having: a first communication section that communicates with the base station; a second communication section that communicates with the terminal; a third communication section that communicates with another communication apparatus; an information generation section that generates traffic information of the communication apparatus through the first communication section or the second communication section; an information acquisition section that acquires traffic information of the another communication apparatus through the third communication section; and a control section that controls the communication apparatus to which the terminal connects based on the traffic information acquired by the information acquisition section and the traffic information generated by the information generation section.

Thus, since the communication apparatus to which the terminal connects is determined based on the traffic of each communication apparatus, the transmission rate of the communication apparatus and the transmission rate of the another communication apparatus can be improved.

The invention also provides a communication apparatus to which at least one terminal can connect by radio and that can radio-communicate with a base station, the communication apparatus having: a first communication section that communicates with the base station; a second communication section that communicates with the terminal; an information generation section that generates traffic information of the communication apparatus through the first communication section or the second communication section; a third communication section that transmits the traffic information generated by the information generation section to another communication apparatus, and receives control information based on the transmitted traffic information; and a control section that controls a connection of the terminal based on the control information received by the third communication section.

The traffic information may be any of a transmission rate of radio communications between the communication apparatus and the base station conducted by the first communication section, the amount of utilization of a line between the communication apparatus and the terminal conducted by the second communication section, or the number of terminals connected to the communication apparatus.

The invention also provides a communication system having: a communication apparatus including a first communication section that communicates with a base station, a second communication section that communicates with a terminal, an information generation section that generates traffic information of the communication apparatus through the first communication section or the second communication section, a third communication section that transmits the traffic information generated by the information generation section to another communication apparatus and receives control information based on the transmitted traffic information, and a control section that controls a connection of the terminal based on the control information received by the third communication section; and a communication control apparatus including an information acquisition section that acquires each traffic information from a plurality of communication apparatuses, a monitor section that monitors traffic of each communication apparatus based on the traffic information acquired by the information acquisition section, a control section that controls a communication apparatus to which the terminal connects based on the traffic of each communication apparatus, and a transmission section that transmits control information to the communication apparatus to which the terminal connects.

The communication control apparatus may have a first communication section that communicates with a base station, a second communication section that communicates with a terminal, and an information generation section that generates traffic information of the communication apparatus through the first communication section or the second communication section. The monitor section may monitor traffic of each communication apparatus based on the traffic information of each communication apparatus acquired by the information acquisition section and the traffic information generated by the information generation section and the control section may control a connection of the terminal based on the traffic of each communication apparatus.

The traffic information may be any of a transmission rate of radio communications between the communication apparatus and the base station conducted by the first communication section, the amount of utilization of a line between the communication apparatus and the terminal conducted by the second communication section, or the number of terminals connected to the communication apparatus or the communication control apparatus.

Conversion of any desired combination of the components described above and the representation of the invention among methods, units, systems, record media, computer programs, etc., is also effective as an aspect of the invention.

Thus, there can be provided the communication control apparatus capable of improving the transmission rate, and the communication apparatus and the communication system using the communication control apparatus.

DETAILED DESCRIPTION OF THE PREFERRED EMBODIMENTS

In an embodiment of the invention, a communication apparatus installed in each railroad vehicle will be discussed. The communication apparatus of the embodiment has a function of communicating with each of an EV-DO base station installed outside the vehicle, a W-LAN terminal in the vehicle, and a communication apparatus installed in another vehicle, and realizes indirect communications between the W-LAN terminal used by the user and an EV-DO base station. One of the installed communication apparatus is set to the master communication apparatus and others are set to slave communication apparatus. Each slave communication apparatus generates traffic information concerning the communicating EV-DO base station and terminal and transmits the traffic information to the master communication apparatus.

The master communication apparatus generates its own traffic information and also acquires the traffic information of other slave communication apparatus and collects them to generate a traffic information table. The master communication apparatus determines that the communication apparatus with light EV-DO traffic among the communication apparatus is the relay destination communication apparatus based on the traffic information table. The master communication apparatus determines that the communication apparatus with heavy EV-DO traffic is the relay source communication apparatus. Further, the master communication apparatus determines one of the terminals connected to the relay source communication apparatus (which is called "selection communication terminal") and gives an instruction for relaying data between the selection communication terminal and the relay source communication apparatus between the relay destination communication apparatus and the relay source communication apparatus and communicating the data between the relay destination communication apparatus and the EV-DO base station.

An information distribution server is connected to each of the communication apparatus and each terminal can communicate with the communication apparatus for receiving information distributed from the information distribution server. The master communication apparatus determines that the communication apparatus with light traffic with the information distribution server among the communication apparatus is the relay destination communication apparatus based on the traffic information table. The master communication apparatus determines that the communication apparatus with heavy traffic with the information distribution server is the relay source communication apparatus. The master communication apparatus executes data relay processing as with the case of the EV-DO. The master communication apparatus and the slave communication apparatus are connected by a wired or wireless communication line to transmit and receive the traffic information, etc. Particularly, to use a wireless line, they can also be connected by W-LAN. However, to avoid confusion with W-LAN of a network between a communication apparatus and a W-LAN terminal, the above-mentioned communication line is called "information exchange line" or simply "information exchange."

Figure 1:
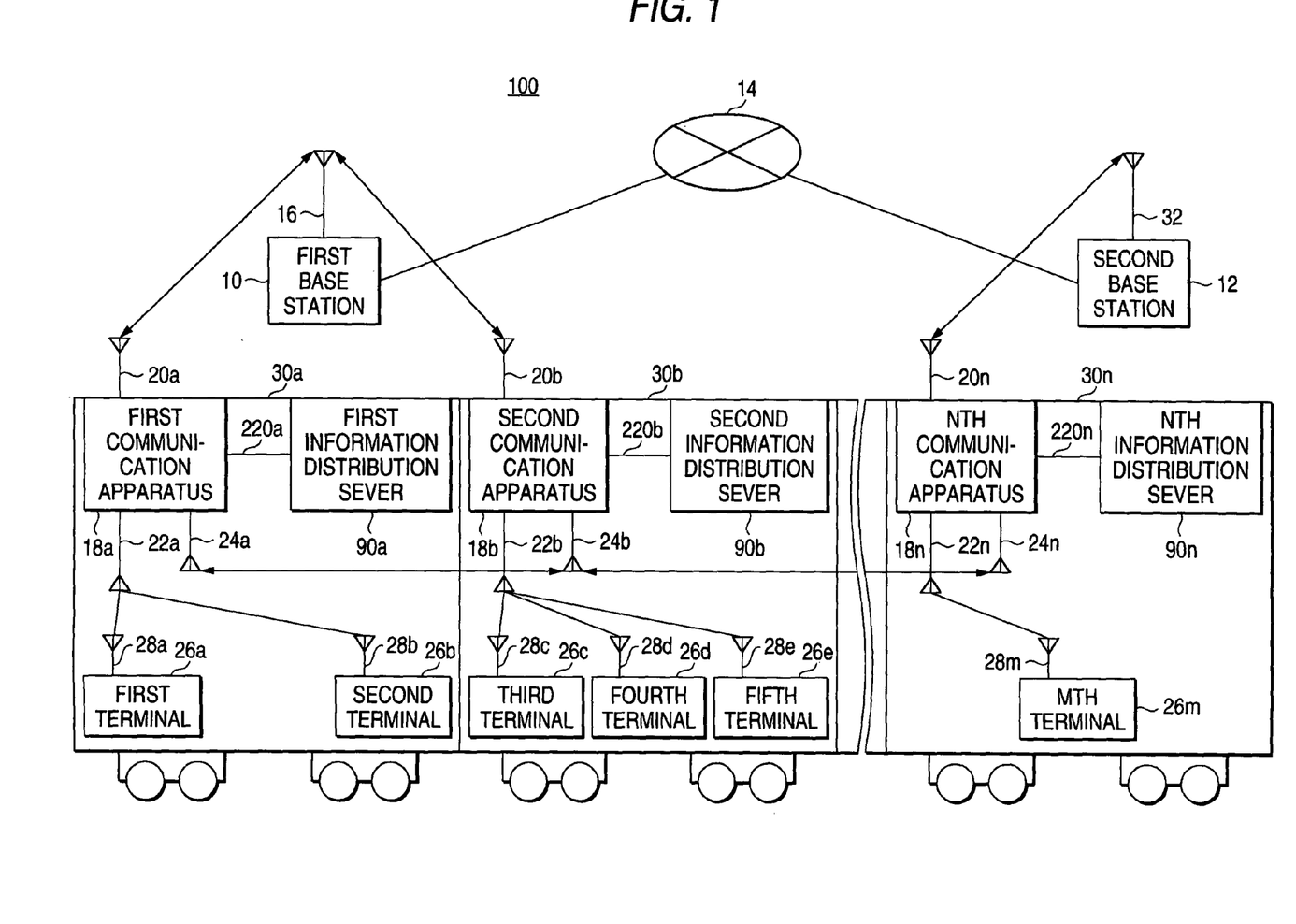
FIG. 1 is a diagram to show the configuration of a communication system of an embodiment of the invention.

FIG. 1 shows a communication system 100 of the embodiment. The communication system 100 is used in a first vehicle 30a, a second vehicle 30b, ... an Nth vehicle 30n collectively called vehicle 30. The communication system 100 includes a first base station 10, a second base station 12, a network 14, a first communication apparatus 18a, a second communication apparatus 18b, ... an Nth communication apparatus 18n collectively called communication apparatus 18, a first terminal 26a, a second terminal 26b, a third terminal 26c, a fourth terminal 26d, a fifth terminal 26e, ... an Mth terminal 26m collectively called terminal 26, and a first information distribution server 90a, a second information distribution server 90b, ... an Nth information distribution server 90n collectively called information distribution server 90.

The first base station 10 includes a first base station antenna 16. The second base station 12 includes a second base station antenna 32. The communication apparatus 18 includes a first EV-DO antenna 20a, a second EV-DO antenna 20b, ... an Nth EV-DO antenna 20n collectively called EV-DO antenna 20, a first W-LAN antenna 22a, a second W-LAN antenna 22b, ... an Nth W-LAN antenna 22n collectively called W-LAN antenna 22, and a first information exchange antenna 24a, a second information exchange antenna 24b, ... an nth information exchange antenna 24n collectively called information exchange antenna 24. The terminal 26 includes a first terminal antenna 28a, a second terminal antenna 28b, a third terminal antenna 28c, a fourth terminal antenna 28d, a fifth terminal antenna 28e, ... an Mth terminal antenna 28m collectively called terminal antenna 28. A first server signal line 220a, a second server signal line 220b, ... an Nth server signal line 220n collectively called server signal line 220 are included as signal lines.

A plurality of vehicles 30 are connected, pick up users, and move crossing a service area formed by the first base station 10 or the second base station 12.

The terminal 26 is used by the user for communicating with the communication apparatus 18. The communication system of the terminal 26 is W-LAN and has the terminal antenna 28 covering the W-LAN frequency.

Both the first base station 10 and the second base station 12 are base stations compatible with the EV-DO and communicate with the communication apparatus 18. The first base station 10 and the second base station 12 can also access the network 14. The first base station 10 and the second base station 12 have the first base station antenna 16 and the second base station antenna 32 each being a three-sector antenna having 120-degree directivity, respectively. Each sector is assigned PN number. An example of the maximum transmission rate of W-LAN is 11 Mbps or 54 Mbps and the maximum transmission system of EV-DO is 24 Mbps. That is, the EV-DO is a low-speed communication system as compared with the W-LAN. Thus, the transmission rate of the vehicle 30 to the outside is lower than the transmission rate inside the vehicle 30. Hereafter, the first base station 10 and the second base station 12 may be called simply "base station" or "EV-DO base station."

The communication apparatus 18 has the EV-DO antenna 20, the W-LAN antenna 22, and the information exchange antenna 24 and accordingly has the function of an EV-DO terminal, the function of a W-LAN base station, and the function required for information exchange. In the embodiment, assuming that a plurality of terminals 26 communicate with the first base station 10 or the second base station 12 via the communication apparatus 18 and the traffic becomes heavy, one communication apparatus 18 is installed in one vehicle 30. A plurality of communication apparatus 18 are connected to each other through wire or by radio, and are connected by W-LAN through the information exchange antennas 24. One of the communication apparatus 18 is set to the master communication apparatus and other communication apparatus 18 are set to slave communication apparatus. In the description that follows, for simplicity, they are represented as master communication apparatus and slave communication apparatus and the correspondence between them and the first communication apparatus 18, etc., is not described. The operation of the master communication apparatus and the slave communication apparatus is described later. The communication apparatus 18 in FIG. 1 are connected separately to the first base station 10 or the second base station 12.

The information distribution server 90 is connected to the communication apparatus 18 by the server signal line 220 and further distributes information to the terminal 26 through the communication apparatus 18. The types of information include a moving image, news, etc., but are not limited to them. The information may be distributed to the communication apparatus 18 in multicast or unicast.

Figure 2:
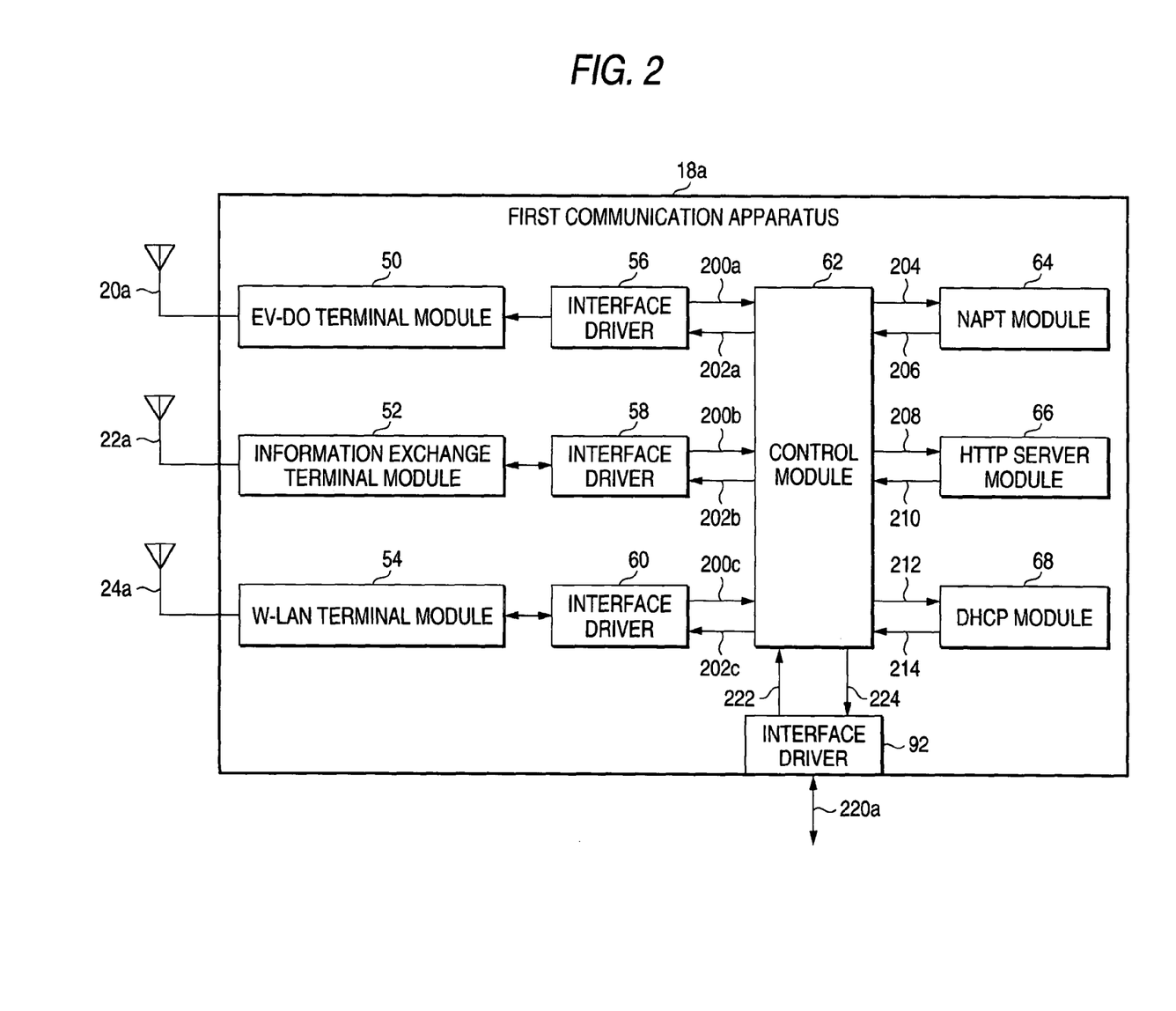
FIG. 2 is a block diagram to show the configuration of a first communication apparatus.

FIG. 2 shows the configuration of the first communication apparatus 18a. The first communication apparatus 18a includes an EV-DO terminal module 50, an information exchange terminal module 52, a W-LAN terminal module 54, a first I/F driver 56, a second I/F driver 58, a third I/F driver 60, a control module 62, an NAPT module 64, an HTTP server module 66, a DHCP module 68, and a fourth I/F driver 92. The first communication apparatus 18a also includes signal lines of a first module output line 200a, a second module output line 200b, and a third module output line 200c collectively called module output line 200, a first module input line 202a, a second module input line 202b, and a third module input line 202c collectively called module input line 202, an NAPT input line 204, an NAPT output line 206, an HTTP input line 208, an HTTP output line 210, a DHCP input line 212, a DHCP output line 214, a server output line 222, and a server input line 224.

The EV-DO terminal module 50 is made up of hardware and software for implementing the function as an EV-DO terminal. The first I/F driver 56 is a driver of an interface for connecting the EV-DO terminal module 50 and the control module 62 and is made up of hardware and software. For example, USB, PCMCIA, etc., is available as the interface. To transmit a signal to the control module 62, the first I/F driver 56 has the first module output line 200a and the first module input line 202a.

The W-LAN terminal module 54 is made up of hardware and software for implementing the function as an AP (Access Point) of W-LAN. The third I/F driver 60 is a driver of an interface for connecting the W-LAN terminal module 54 and the control module 62 and is made up of hardware and software. In the software, a header is added and deleted. To transmit a signal to the control module 62, the third I/F driver 60 has the third module output line 200c and the third module input line 202c.

The information exchange terminal module 52 and the second I/F driver 58 have functions equal to those of the W-LAN terminal module 54 and the third I/F driver 60. To decrease interference between the information exchange line and the W-LAN, the radio frequency is set to a different value from the value of the radio frequency of the W-LAN terminal module 54 or different standards such as IEEE802.11a, IEEE802.11b, and IEEE802.11g are used. To transmit a signal to the control module 62, the second I/F driver 58 has the second module output line 200b and the second module input line 202b.

The NAPT module 64 is a software module having both NAT and IP masquerade functions and is a module for performing address conversion and correspondence management between the local IP address assigned to the terminal 26 and the global IP address assigned from the first base station 10, the second base station 12, or the network 14. To transmit a signal to the control module 62, the NAPT module 64 has the NAPT input line 204 and the NAPT output line 206.

The HTTP server module 66 is a software module having an HTTP server function for downloading content from the Internet and distributing it to the terminal 26. To transmit a signal to the control module 62, the HTTP server module 66 has the HTTP input line 208 and the HTTP output line 210.

The DHCP module 68 is a software module having a function of assigning the local IP address to the terminal 26. To transmit a signal to the control module 62, the DHCP module 68 has the DHCP input line 212 and the DHCP output line 214. The DHCP module 68 presets the range of private IP addresses for each communication apparatus 18 so that the private IP addresses assigned to the plurality of communication apparatus 18 are not duplicated. For example, the range of 192.168.0.1 to 192.168.0.255 is set for the first communication apparatus 18a and the range of 192.168.1.1 to 192.168.1.255 is set for the second communication apparatus 18b.

The control module 62 has a dialup function and a function based on PPP protocol and is a hardware and software module for controlling the EV-DO terminal module 50, the information exchange terminal module 52, the W-LAN terminal module 54, the NAPT module 64, the HTTP server module 66, and the DHCP module 68. The master communication apparatus and the slave communication apparatus described above differ in the function of the control module 62.

The fourth I/F driver 92 is a driver of an interface for connecting the control module 62 and the information distribution server 90 (not shown) and is made up of hardware and software. To transmit a signal to the control module 62, the fourth I/F driver 92 has the server output line 222 and the server input line 224.

Figure 3:
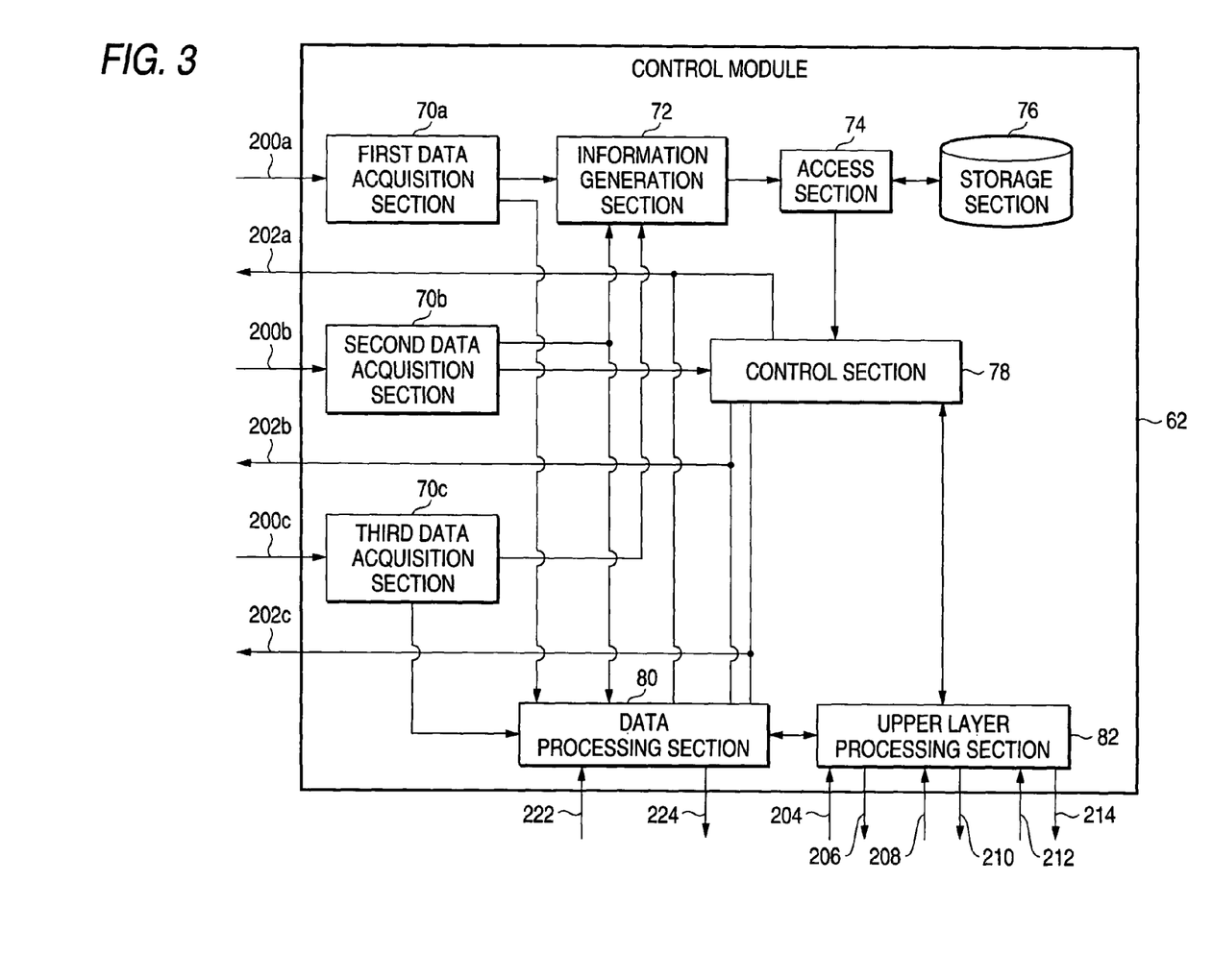
FIG. 3 is a block diagram to show the configuration of a control module.

FIG. 3 shows the configuration of the control module 62. The control module 62 includes a first data acquisition section 70a, a second data acquisition section 70b, and a third data acquisition section 70c collectively called data acquisition section 70, an information generation section 72, an access section 74, a storage section 76, a control section 78, a data processing section 80, and an upper layer processing section 82.

The data acquisition section 70 changes the output destination in response to the contents of data input from the module output line 200. The first data acquisition section 70a outputs data to the information generation section 72 or the data processing section 80. The second data acquisition section 70b outputs data to the information generation section 72, the control section 78, or the data processing section 80. The third data acquisition section 70c outputs data to the information generation section 72 or the data processing section 80.

The information generation section 72 generates traffic information based on the data input from the first data acquisition section 70a and the third data acquisition section 70c. The traffic information includes average downlink throughput of EV-DO communications, the number of terminals using the EV-DO, EV-DO throughput per terminal, W-LAN average traffic, the number of W-LAN terminals, and W-LAN terminal information. The master communication apparatus acquires the traffic information from the slave communication apparatus through the second data acquisition section 70b. The master communication apparatus creates a traffic information table from the generated traffic information and the acquired traffic information and records the created traffic information table in the storage section 76 through the access section 74. On the other hand, the slave communication apparatus records the generated traffic information in the storage section 76 through the access section 74.

Figure 4:
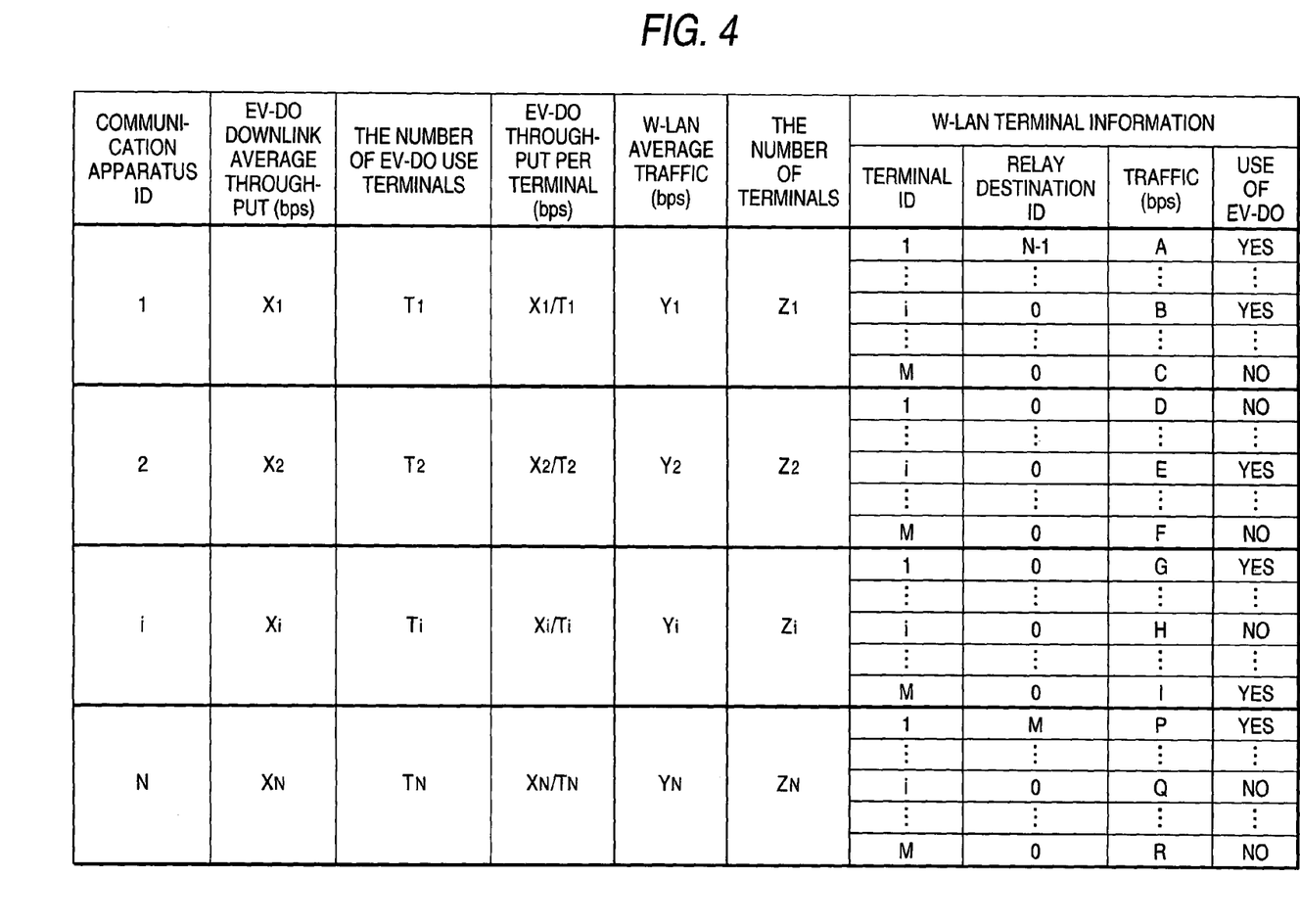
FIG. 4 is a drawing to show the data structure of a traffic information table.

The storage section 76 stores the traffic information and the traffic information table. FIG. 4 shows the data structure of the traffic information table. "Communication apparatus ID" shown in FIG. 4 indicates the ID number previously given to the communication apparatus 18. In the "W-LAN terminal information," "terminal ID" indicates the ID number previously given to the terminal 26. "EV-DO use" indicates whether or not the terminal 26 is connected to a base station through the communication apparatus 18 and "no" indicates a state in which the terminal 26 is not connected to any base station and information is distributed from the information distribution server 90.

If the communication apparatus 18 is the master communication apparatus, the control section 78 levels the W-LAN traffic of the master communication apparatus and the slave communication apparatus from the traffic amounts of the terminals 26 connected to the communication apparatus 18 based on the traffic information table stored in the storage section 76. That is, the control section 78 selects the communication apparatus 18 with the W-LAN traffic larger than a predetermined threshold value as the relay source communication apparatus and selects the communication apparatus 18 with the smaller W-LAN traffic as the relay destination communication apparatus. Further, the control section 78 instructs the relay destination communication apparatus to relay data from the terminals 26 connected to the relay source communication apparatus and transmit the data to the base station from the EV-DO communication line connected to the relay destination communication apparatus. The data relay method is described later in detail.

Figure 5:
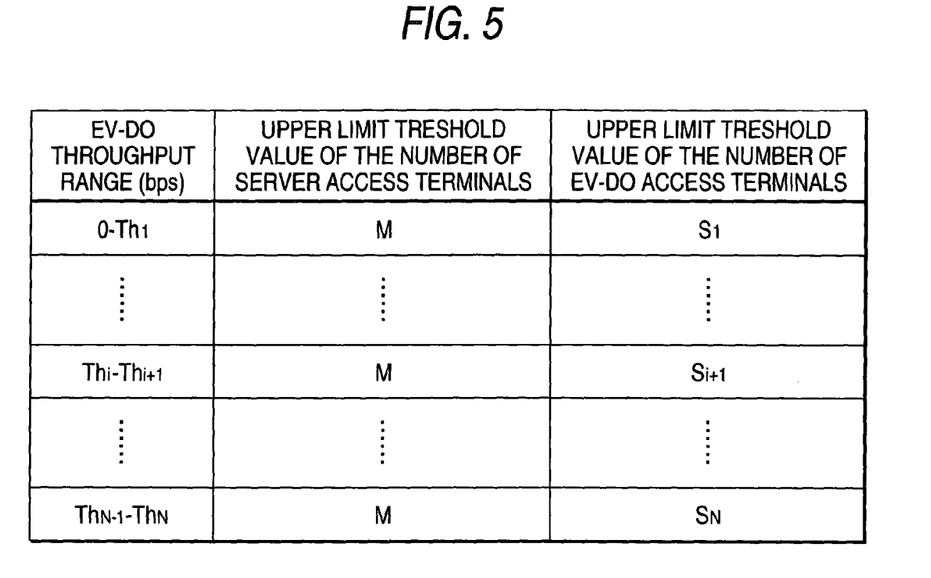
FIG. 5 is a drawing to show the data structure of an upper limit threshold value determination table.
Figure 6:
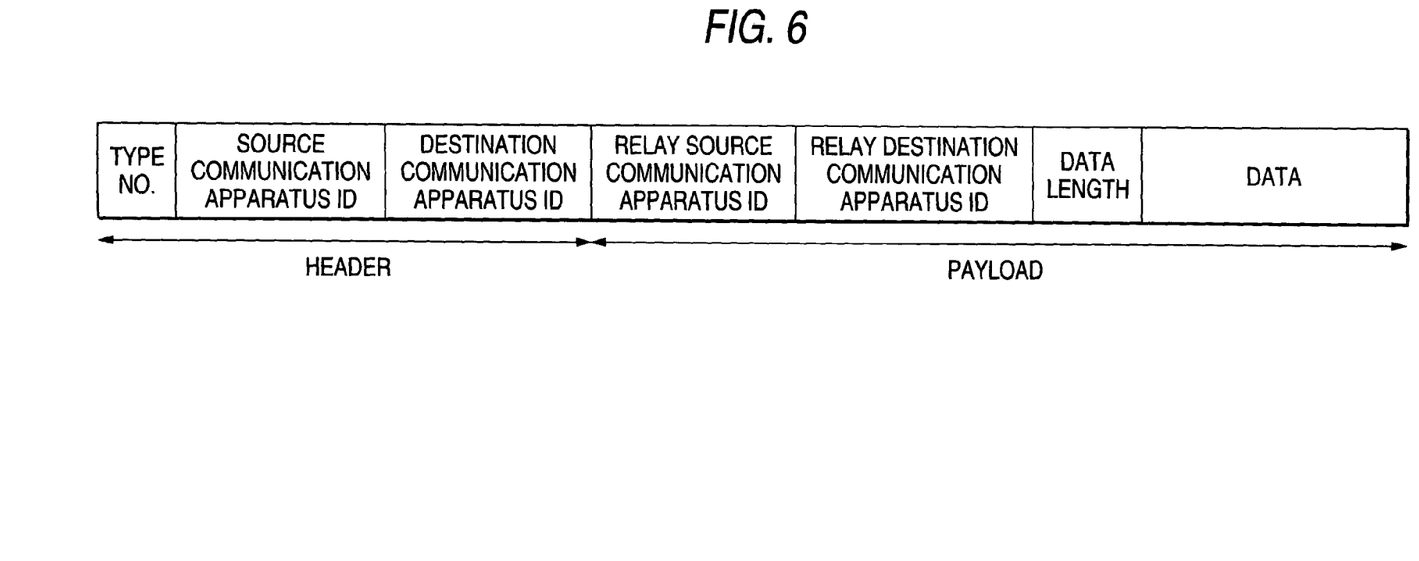
FIG. 6 is a drawing to show a burst format for information exchange.
Figure 7:
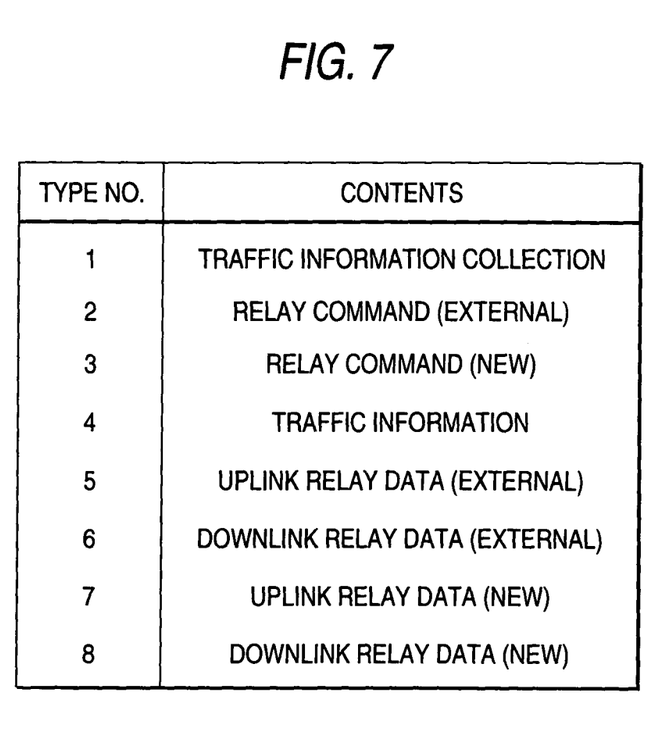
FIG. 7 is a drawing to show the description of an identification number.

If the communication apparatus 18 is the master communication apparatus, the control section 78 of the master communication apparatus determines the upper limit threshold value of the number of server access terminals and the upper limit threshold value of the number of EV-DO access terminals based on the traffic information table stored in the storage section 76. FIG. 5 shows the data structure of an upper limit threshold value determination table recorded in the storage section 76. The control section 78 determines the upper limit threshold values described above in response to the EV-DO throughput in the traffic information table. The upper limit threshold values correspond to the validity of the number of terminals accessing the information distribution server 90 and the number of terminals accessing in the EV-DO. The control section 78 generates information exchanged through the information exchange terminal module 52 between the master communication apparatus and the slave communication apparatus. FIG. 6 shows the burst format for information exchange. The identification number type of areas shown in FIG. 6 is shown in FIG. 7.

When the master communication apparatus requests the slave communication apparatus to send traffic information, the control section 78 sets "1" of a traffic information collection command in "type No." shown in FIG. 6. The control section 78 sets "ID of master communication apparatus" in "source communication apparatus ID," sets "0" meaning broadcast in "destination communication apparatus ID," and sets "0" in "relay source communication apparatus ID" and "relay destination communication apparatus ID."

Upon reception of the traffic information collection command from the master communication apparatus, the slave communication apparatus returns traffic information to the master communication apparatus. In this case, the control section 78 sets "4" of the traffic information command in "type No." The control section 78 sets "communication apparatus ID of each slave communication apparatus" in "source communication apparatus ID," sets "ID of master communication apparatus" in "destination communication apparatus ID," and sets "0" in "relay source communication apparatus ID" and "relay destination communication apparatus ID." "Traffic information" is entered in a field of data.

When the master communication apparatus gives a relay instruction to the relay source communication apparatus, the control section 78 sets "2" indicating a relay command to the outside of W-LAN in "type No." The control section 78 sets "ID of master communication apparatus" in "source communication apparatus ID," sets "ID of relay source communication apparatus" in "destination communication apparatus ID," and sets the IDs of the corresponding communication apparatus in "relay source communication apparatus ID" and "relay destination communication apparatus ID." The ID of "relay target terminal" is entered in the field of data.

When the relay source communication apparatus transmits the relay target terminal data to the relay destination communication apparatus, the control section 78 sets "5" indicating uplink relay data in "type No." The control section 78 sets "relay source communication apparatus ID" in "source communication apparatus ID," sets "relay destination communication apparatus ID" in "destination communication apparatus ID," and sets the IDs of the corresponding communication apparatus in "relay source communication apparatus ID" and "relay destination communication apparatus ID." The data of "relay target terminal" is capsuled to involve the private IP address assigned in the relay source communication apparatus.

When the relay destination communication apparatus transmits the relay target terminal data to the relay source communication apparatus, the control section 78 sets "6" indicating downlink relay data in "type No." The control section 78 sets "relay destination communication apparatus ID" in "source communication apparatus ID," sets "relay source communication apparatus ID" in "destination communication apparatus ID," and sets the IDs of the corresponding communication apparatus in "relay source communication apparatus ID" and "relay destination communication apparatus ID."

When the master communication apparatus gives a relay instruction to the relay source communication apparatus in regard to data of the information distribution server 90, the control section 78 sets "3" indicating a new relay command in "type No." The control section 78 sets "ID of master communication apparatus" in "source communication apparatus ID," sets "ID of relay source communication apparatus" in "destination communication apparatus ID," and sets the IDs of the corresponding communication apparatus in "relay source communication apparatus ID" and "relay destination communication apparatus ID." The ID of "relay target terminal" is entered in the field of data.

When the relay source communication apparatus transmits the relay target terminal data to the relay destination communication apparatus in regard to the information distribution server 90, the control section 78 sets "7" indicating uplink relay data in "type No." The control section 78 sets "relay source communication apparatus ID" in "source communication apparatus ID," sets "relay destination communication apparatus ID" in "destination communication apparatus ID," and sets the IDs of the corresponding communication apparatus in "relay source communication apparatus ID" and "relay destination communication apparatus ID." The data of "relay target terminal" is capsuled to involve the private IP address assigned in the relay source communication apparatus.

When the relay destination communication apparatus transmits the relay target terminal data to the relay source communication apparatus in regard to the information distribution server 90, the control section 78 sets "8" indicating downlink relay data in "type No." The control section 78 sets "relay destination communication apparatus ID" in "source communication apparatus ID," sets "relay source communication apparatus ID" in "destination communication apparatus ID," and sets the IDs of the corresponding communication apparatus in "relay source communication apparatus ID" and "relay destination communication apparatus ID."

Referring again to FIG. 3, the data processing section 80 transmits and receives data to and from the EV-DO terminal module 50, the information exchange terminal module 52, and the W-LAN terminal module 54 and further transmits and receives data to and from the information distribution server 90 and the data acquisition section 70. For example, the data processing section 80 outputs the data input from the first data acquisition section 70a to the third module input line 202c. The data processing section 80 accepts an instruction from the upper layer for transmitting and receiving data in the upper layer processing section 82 and outputs data transferred to the upper layer to the upper layer processing section 82.

This configuration can be implemented by a CPU, memory, and other LSIs of any computer as hardware and by a program having a reservation management function loaded into memory as software. FIG. 3 draws functional blocks implemented as they operate in conjunction with each other. Therefore, it is understood by those skilled in the art that the functional blocks can be implemented in various forms by hardware only, software only, or using them in combination.

Figure 8:
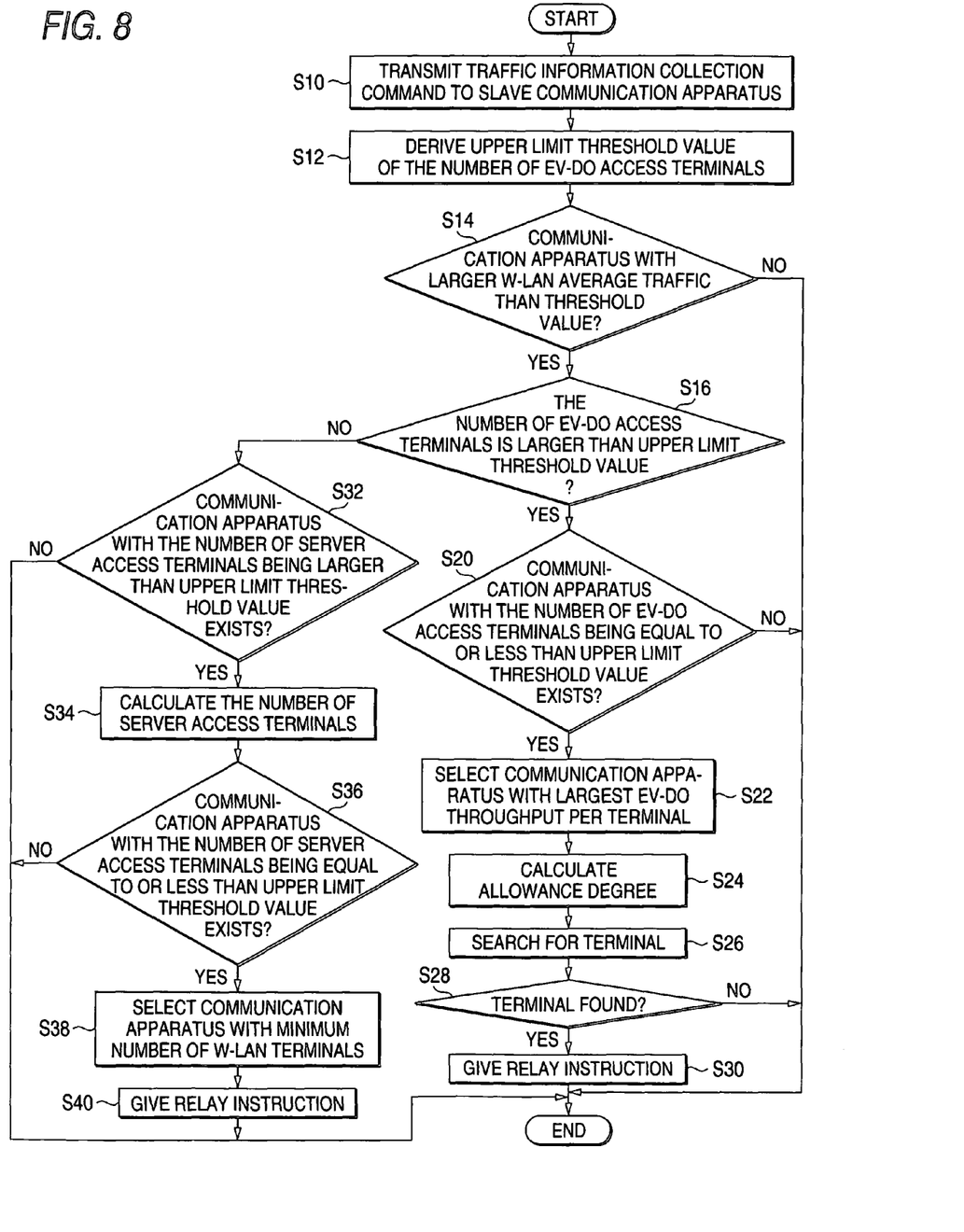
FIG. 8 is a flowchart to show a relay station selection procedure of a master communication apparatus of the embodiment.

FIG. 8 is a flowchart to show a relay station selection procedure of the master communication apparatus. The control section 78 transmits a traffic information collection command to the slave communication apparatus through the second module input line 202b (S10). The burst format for transmitting the traffic information collection command is as shown in FIG. 6. The master communication apparatus transmits such a burst at predetermined time intervals. In the description that follows, the operation in the case where one traffic information collection command is transmitted will be discussed. The information generation section 72 receives traffic information through the second data acquisition section 70b and the information generation section 72 generates the traffic information table shown in FIG. 4.

The generated traffic information table is recorded in the storage section 76. The control section 78 derives the upper limit threshold value of the number of EV-DO access terminals based on the traffic information table (S12). The information generation section 72 compares the W-LAN average traffic with a predetermined threshold value for each communication apparatus 18. If a communication apparatus 18 with a value larger than the threshold value exists (Y at S14), it is determined that the W-LAN band is already fully used. If the number of EV-DO access terminals is larger than the upper limit threshold value (Y at S16), the control section 78 determines that the EV-DO frequency band is also shared among the terminals 26, and sets the communication apparatus 18 to the relay source communication apparatus. The control section 78 searches for a communication apparatus 18 with the number of EV-DO access terminals being equal to or less than the upper limit threshold value. Further, if the corresponding communication apparatus 18 are found as the search result (Y at S20), the control section 78 selects the communication apparatus 18 with the largest EV-DO throughput per terminal among the found communication apparatus (S22), and sets the communication apparatus to the relay destination communication apparatus.

Next, the control section 78 subtracts the EV-DO downlink average throughput divided by the upper limit threshold value of the number of EV-DO access terminals from the EV-DO throughput per terminal in the relay destination communication apparatus to calculate the allowance degree (S24). This allowance degree indicates the degree of the allowance of the EV-DO throughput in the relay destination communication apparatus. The control section 78 searches the terminals 26 using the EV-DO, connected to the relay source communication apparatus for the terminal 26 having the maximum traffic in the W-LAN traffic smaller than the allowance degree (S26) If the corresponding terminal 26 is found (Y at S28), the control section 78 sets the found terminal 26 to the relay target terminal. The control section 78 instructs the relay destination communication apparatus to communicate with the base station with the relay target terminal data relayed from the relay source communication apparatus through the information exchange terminal module 52 (S30). The burst format for transmitting the relay target terminal data to be relayed is as shown in FIG. 6.

On the other hand, when the information generation section 72 compares the W-LAN average traffic with the predetermined threshold value, if a communication apparatus 18 with a value larger than the threshold value does not exist (N at S14), the control section 78 searches for a communication apparatus 18 with the number of EV-DO access terminals being equal to or less than the upper limit threshold value. Further, if the corresponding communication apparatus 18 is not found as the search result (N at S20), the control section 78 determines that allowance for the W-LAN band still exists and data need not be relayed to a different communication apparatus 18 for distributing the load or there is no relay-able communication apparatus, and terminates the processing. If the terminal 26 having the maximum traffic in the W-LAN traffic smaller than the allowance degree is not found among the terminals 26 using the EV-DO, connected to the relay source communication apparatus (N at S28), the processing is also terminated.

If the number of EV-DO access terminals is equal to or smaller than the upper limit threshold value (N at S16) and a communication apparatus 18 with the number of server access terminals being larger than the upper limit threshold value shown in FIG. 5 exists (Y at S32), the control section 78 determines that the service capability of the information distribution server 90 through the communication apparatus 18 reaches the limit, and also sets the communication apparatus 18 to the relay source communication apparatus. For other communication apparatus 18, the control section 78 subtracts the number of EV-DO use terminals from the number of terminals in the traffic information table to calculate the number of server access terminals (S34).

The control section 78 selects a communication apparatus 18 with the number of server access terminals being equal to or less than the upper limit threshold value (Y at S36) and with the minimum number of W-LAN terminals (S38) and also sets the selected communication apparatus 18 to the relay destination communication apparatus. The control section 78 sets the terminal sending a new connection request to the relay source communication apparatus to the relay target terminal, instructs the relay source communication apparatus to relay data to and from the relay target communication apparatus to the relay destination communication apparatus through the information exchange terminal module 52, and instructs the relay destination communication apparatus to communicate with the information distribution server 90 with the relay target terminal data relayed from the relay source communication apparatus through the information exchange terminal module 52 (S40). The burst format for transmitting the relay target terminal data to be relayed is as shown in FIG. 6. If a terminal 26 with the number of server access terminals being larger than the upper limit threshold value does not exist (N at S32) or if a terminal 26 with the number of server access terminals being equal to or less than the upper limit threshold value other than the relay source communication apparatus does not exist (N at S36), the processing is terminated.

Figure 9:
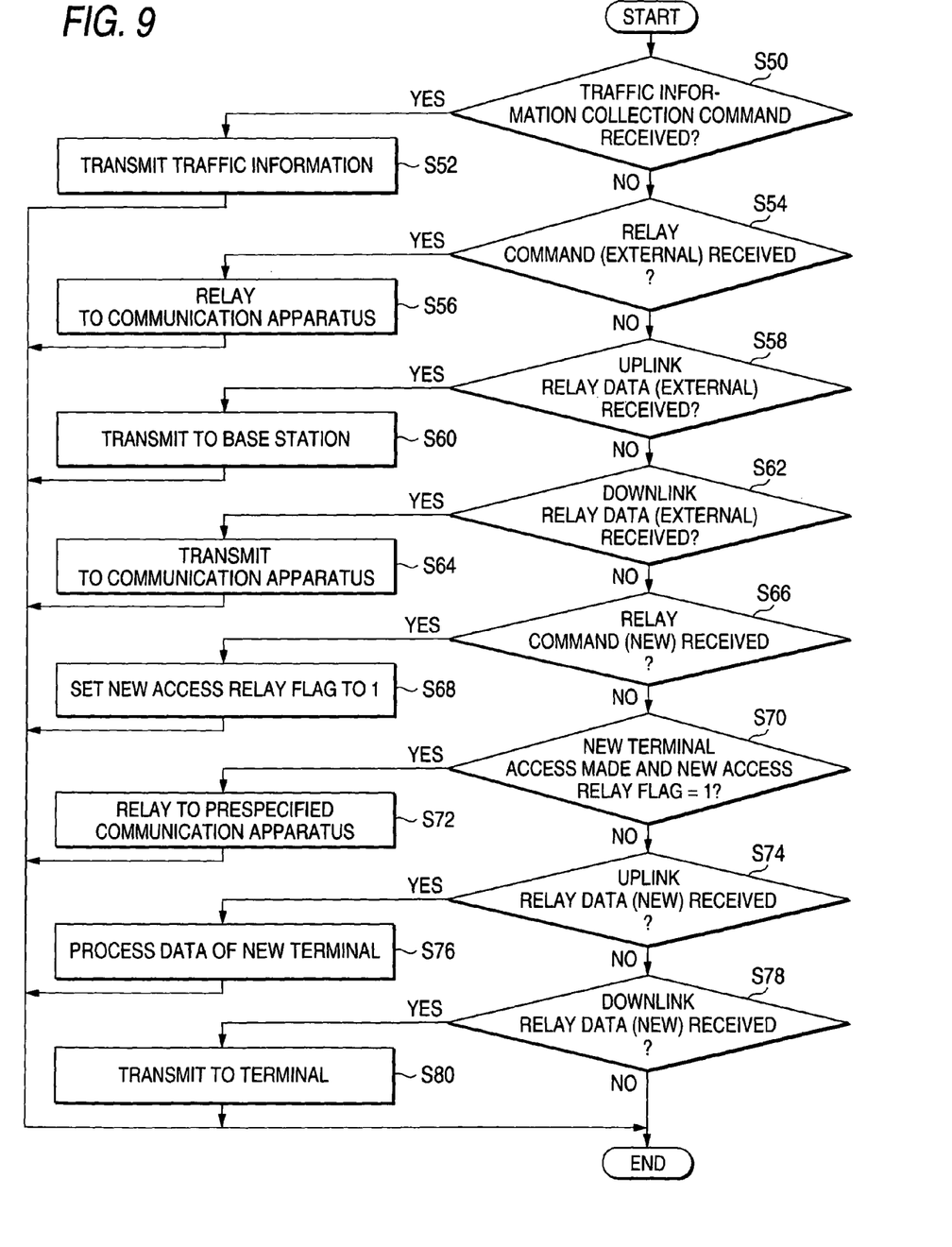
FIG. 9 is a flowchart to show a relay station selection procedure of a slave communication apparatus of the embodiment.

FIG. 9 is a flowchart to show a relay station selection procedure of the slave communication apparatus. If the control section 78 receives a traffic information collection command through the second data acquisition section 70b (Y at S50), the control section 78 transmits the traffic information stored in the storage section 76 to the master communication apparatus (S52). If the control section 78 does not receive a traffic information collection command through the second data acquisition section 70b (N at S50) and receives a relay command to the outside of the W-LAN (Y at S54), the control section 78 relays data of the selection communication terminal to a different communication apparatus 18 through the information exchange terminal module 52 and the W-LAN terminal module 54 (S56).

If the control section 78 does not receive a relay command to the outside of the W-LAN through the second data acquisition section 70b (N at S54) and receives uplink relay data with the outside of the W-LAN through the second data acquisition section 70b (Y at S58), the control section 78 transmits the data to the base station through the EV-DO terminal module 50 (S60). If the control section 78 does not receive uplink relay data with the outside of the W-LAN (N at S58) and receives downlink relay data with the outside of the W-LAN through the first data acquisition section 70a (Y at S62), the control section 78 transmits the data to the relay source communication apparatus through the information exchange terminal module 52 (S64). If the control section 78 does not receive downlink relay data with the outside of the W-LAN through the first data acquisition section 70a (N at S62) and receives a relay command for a new terminal 26 through the second data acquisition section 70b (Y at S66), the control section 78 sets a new access relay flag to 1 (S68).

If the control section 78 does not receive a relay command for a new terminal 26 through the second data acquisition section 70b (N at S66) and access is made from a new terminal 26 and the new access relay flag is 1 (Y at S70), the control section 78 relays the data of the selection communication terminal to predetermined communication apparatus 18 (S72). If no access is made from a new terminal 26 or the new access relay flag is not 1 (N at S70) and uplink relay data for a new terminal 26 is received through the second data acquisition section 70b (Y at S74), the information distribution server 90 is caused to process data of the new terminal 26 (S76). If the control section 78 does not receive uplink relay data for a new terminal 26 through the second data acquisition section 70b (N at S74) and receives downlink relay data for a new terminal 26 through the first data acquisition section 70a (Y at S78), the control section 78 transmits the data to the new terminal 26 through the W-LAN terminal module 54 (S80).

The operation of the described communication system 100 is as follows: The control section 78 of the master communication apparatus transmits a traffic information collection command to the slave communication apparatus. The information generation section 72 of the slave communication apparatus generates traffic information and records the traffic information in the storage section 76. Upon reception of the traffic information collection command, the information generation section 72 transmits the traffic information to the master communication apparatus. The information generation section 72 of the master communication apparatus generates traffic information and also receives the traffic information from the slave communication apparatus and creates a traffic information table based on the traffic information. The control section 78 of the master communication apparatus determines the relay source communication apparatus and the relay destination communication apparatus based on the created traffic information table and further determines that one of the terminals 26 connected to the relay source communication apparatus is the relay target terminal. The control section 78 of the master communication apparatus instructs the relay source communication apparatus and the relay destination communication apparatus to relay the relay target terminal data.

In the embodiment, data of the terminal connected to the communication apparatus with heavy traffic with the base station is relayed by the communication apparatus with light traffic with the base station and is transmitted to the base station. Thus, the transmission rate of a plurality of communication apparatus can be improved. Data of the terminal connected to the communication apparatus with heavy traffic of data from the information distribution server is relayed by the communication apparatus with light traffic of data from the information distribution server, so that processing of the information distribution servers can be smoothed. The data in relaying between the communication apparatus is transmitted simply by capsuling data when not relayed, so that the processing can be lessened.

It is to be understood by those skilled in the art that the embodiment is illustrative and that various modifications can be made in the combination of the components and the processes and such modifications are also involved in the scope of the invention.

In the embodiment, the EV-DO is adopted as the communication system between the first base station 10 and the communication apparatus 18 and the W-LAN is adopted as the communication system between the communication apparatus 18 and the terminal 26. However, the invention is not limited to them; a different communication system, for example, Personal Handyphone System may be adopted, for example, as the communication system between the first base station 10 and the communication apparatus 18. Further, different communication systems are adopted as the communication system between the first base station 10 and the communication apparatus 18 and the communication system between the communication apparatus 18 and the terminal 26, but the same communication system may be adopted. According to the modification, the invention can be applied to various communication systems. That is, the communication system between the first base station 10 and the communication apparatus 18 may be any if it enables communications with the communication apparatus 18 installed inside the vehicle 30 from the first base station 10 installed outside the vehicle 30.

In the embodiment, one of the communication apparatus 18 is set to the master communication apparatus. However, the invention is not limited to it; for example, one master communication apparatus and four slave communication apparatus may be installed in the vehicles of the first vehicle 30a to the fifth vehicle 30e for executing the processing of the embodiment and one master communication apparatus and four slave communication apparatus may be installed in the vehicles of the sixth vehicle 30f to the tenth vehicle 30j for executing the processing of the embodiment aside from the vehicles of the first vehicle 30a to the fifth vehicle 30e.

What is claimed is:

1. A communication control apparatus for controlling a plurality of communication apparatuses to which at least one terminal can connect by radio and that can radio-communicate with a base station, the communication control apparatus comprising:

a communication section that communicates with the plurality of communication apparatuses;

an information acquisition section that acquires traffic information in the plurality of communication apparatuses through the communication section, wherein the traffic includes traffic of the communication apparatus itself or between the communication apparatus and the base station, and the plurality of communication apparatuses communicate with the base station via different antennas;

a monitor section that monitors traffic of each communication apparatus based on the traffic information acquired by the information acquisition section; and a control section that controls a relay of data between the plurality of communication apparatuses to each other based on the traffic of each of the communication apparatuses.

2. The communication control apparatus according to claim 1, wherein the traffic information acquired by the information acquisition section is a transmission rate of radio communications between the communication apparatus and the base station.

3. The communication control apparatus according to claim 1, wherein the traffic information acquired by the information acquisition section is the amount of utilization of a line between the communication apparatus and the terminal, or the number of terminals connected to the communication apparatus.

4. A communication apparatus to which at least one terminal can connect by radio and that can radio-communicate with a base station, the communication apparatus comprising:

a first communication section that communicates with the base station;

a second communication section that communicates with the terminal;

a third communication section that communicates with another communication apparatus to which at least one terminal can connect by radio and that can radio-communicate with a base station;

an information generation section that generates traffic information in the communication apparatus based on data that comes through the first communication section or the second communication section, wherein the traffic includes traffic of the communication apparatus itself or between the communication apparatus and the base station;

an information acquisition section that acquires traffic information in the another communication apparatus through the third communication section, wherein the traffic includes traffic of the another communication apparatus itself or between the another communication apparatus and the base station, and the communication apparatus and the another communication apparatus communicate with the base station via different antennas; and a control section that controls a relay of data between the plurality of communication apparatuses to each other based on the traffic information acquired by the information acquisition section and the traffic information generated by the information generation section.

5. A communication apparatus to which at least one terminal can connect by radio and that can radio-communicate with a base station, the communication apparatus comprising:

a first communication section that communicates with the base station;

a second communication section that communicates with the terminal;

an information generation section that generates traffic information in the communication apparatus based on data that comes through the first communication section or the second communication section, wherein the traffic includes traffic of the communication apparatus itself or between the communication apparatus and the base station;

a third communication section that transmits the traffic information generated by the information generation section to a predetermined communication apparatus to which at least one terminal can connect by radio and that can radio-communicate with a base station, and receives control information based on the transmitted traffic information from the predetermined communication apparatus, wherein the communication apparatus and the predetermined communication apparatus communicate with the base station via different antennas; and a control section that controls a relay of data between the communication apparatus and the predetermined communication apparatus to each other based on the control information received by the third communication section.

6. The communication apparatus according to claim 4, wherein the traffic information is any of a transmission rate of radio communications between the communication apparatus and the base station conducted by the first communication section, the amount of utilization of a line between the communication apparatus and the terminal conducted by the second communication section, or the number of terminals connected to the communication apparatus.

7. The communication apparatus according to claim 5, wherein the traffic information is any of a transmission rate of radio communications between the communication apparatus and the base station conducted by the first communication section, the amount of utilization of a line between the communication apparatus and the terminal conducted by the second communication section, or the number of terminals connected to the communication apparatus.

8. A communication system comprising:

a plurality of communication apparatuses to each of which at least one terminal can connect by radio and that can radio-communicate with a base station, each of the plurality of communication apparatuses comprising a first communication section that communicates with the base station, a second communication section that communicates with the terminal, an information generation section that generates traffic information in the communication apparatus based on data that comes through the first communication section or the second communication section, a third communication section that transmits the traffic information and receives control information to and from a communication control apparatus, wherein the traffic includes traffic of the communication apparatus itself or between the communication apparatus and the base station, and the plurality of communication apparatuses communicate with the base station via different antennas, and a control section that controls a relay of data between the plurality of communication apparatuses to each other based on the control information received by the third communication section; and the communication control apparatus comprising an information acquisition section that acquires each of the traffic information from the plurality of the communication apparatuses, a monitor section that monitors traffic of each of the communication apparatuses based on the traffic information acquired by the information acquisition section, a control section that controls at least one of the communication apparatuses to which the terminal connects based on the traffic of each of the communication apparatuses, and a transmission section that transmits control information to the communication apparatus to which the terminal connects.

9. The communication system according to claim 8,
wherein the communication control apparatus comprises a first communication section that communicates with a base station, a second communication section that communicates with a terminal, and an information generation section that generates traffic information of the communication apparatuses through the first communication section or the second communication section,
wherein the monitor section monitors traffic of each of the communication apparatuses based on the traffic information of each of the communication apparatuses acquired by the information acquisition section and the traffic information generated by the information generation section, and the control section controls a connection of the terminal based on the traffic of each of the communication apparatuses.

10. The communication system according to claim 8, wherein the traffic information is any of a transmission rate of radio communications between the communication apparatus and the base station conducted by the first communication section, the amount of utilization of a line between the communication apparatus and the terminal conducted by the second communication section, or the number of terminals connected to the communication apparatus or the communication control apparatus.

11. The communication control apparatus according to claim 1,
wherein said at least one terminal connects to the plurality of communication control apparatuses by radio using a first wireless communication system,
wherein the plurality of communication apparatuses radio-communicate with the base station using a second wireless communication system, and
wherein a transmission rate of the second wireless communication system is lower than that of the first wireless communication system.

12. The communication control apparatus according to claim 1,
wherein said control section selects the communication apparatus with a W-LAN traffic larger than a predetermined threshold value as a relay source communication apparatus, and
wherein said control section selects the communication apparatus with a W-LAN traffic smaller than a predetermined threshold value as a relay destination communication apparatus.

13. The communication apparatus according to claim 4,
wherein said at least one terminal connects to the communication apparatus by radio using a first wireless communication system,
wherein the communication apparatus radio-communicates with the base station using a second wireless communication system, and
wherein a transmission rate of the second wireless communication system is lower than that of the first wireless communication system.

14. The communication apparatus according to claim 4,
wherein said control section selects the communication apparatus with a W-LAN traffic larger than a predetermined threshold value as a relay source communication apparatus, and
wherein said control section selects the communication apparatus with a W-LAN traffic smaller than a predetermined threshold value as a relay destination communication apparatus.

15. The communication apparatus according to claim 5,
wherein said at least one terminal connects to the communication apparatus by radio using a first wireless communication system,
wherein the communication apparatus radio-communicates with the base station using a second wireless communication system, and
wherein a transmission rate of the second wireless communication system is lower than that of the first wireless communication system.

16. The communication apparatus according to claim 5,
wherein said control section selects the communication apparatus with a W-LAN traffic larger than a predetermined threshold value as a relay source communication apparatus, and
wherein said control section selects the communication apparatus with a W-LAN traffic smaller than a predetermined threshold value as a relay destination communication apparatus.

17. The communication system according to claim 8,
wherein the first communication section communicates with the base station using a first wireless communication system,
wherein the second communication section communicates with the terminal using a second wireless communication system, and
wherein a transmission rate of the first wireless communication system is lower than that of the second wireless communication system.

* * * * *